(12) United States Patent
Sonnak

(10) Patent No.: US 6,247,306 B1
(45) Date of Patent: Jun. 19, 2001

(54) PNEUMATIC SPRING SYSTEM

(75) Inventor: Ulrich Sonnak, Hamburg (DE)

(73) Assignee: Phoenix Aktiengesellschaft, Hamburg (DE)

(*) Notice: Subject to any disclaimer, the term of this patent is extended or adjusted under 35 U.S.C. 154(b) by 0 days.

(21) Appl. No.: 09/403,918

(22) PCT Filed: May 5, 1998

(86) PCT No.: PCT/DE98/01234

§ 371 Date: Oct. 27, 1999

§ 102(e) Date: Oct. 27, 1999

(87) PCT Pub. No.: WO98/54016

PCT Pub. Date: Dec. 3, 1998

(30) Foreign Application Priority Data

May 28, 1997 (DE) .............................. 197 22 381

(51) Int. Cl.[7] .............................. F15B 11/08; F16L 29/00
(52) U.S. Cl. .............................. 60/412; 91/432; 251/149.2
(58) Field of Search .............................. 60/407, 412; 91/432; 251/149.2, 149.4

(56) References Cited

U.S. PATENT DOCUMENTS

| | | | |
|---|---|---|---|
| 4,671,323 | * 6/1987 | Buma | 137/846 |
| 5,328,005 | 7/1994 | Van Breemen . | |
| 5,467,595 | * 11/1995 | Smith | 60/412 |
| 5,613,663 | * 3/1997 | Schmidt et al. | 251/149.2 |

FOREIGN PATENT DOCUMENTS

| | | |
|---|---|---|
| 44 38 192 | 5/1996 | (DE) . |
| 0 178 245 | 4/1986 | (EP) . |

* cited by examiner

Primary Examiner—F. Daniel Lopez
Assistant Examiner—Michael Leslie
(74) Attorney, Agent, or Firm—Collard & Roe, P.C.

(57) ABSTRACT

The invention relates to a pneumatic spring system comprising at least one pneumatic spring which consists of at least the following: a pneumatic spring cap as an upper component; a pneumatic spring piston as a lower component; pneumatic cushioning bellows made of elastomer connecting the two opposite components with the help of fastening elements. The bellows can roll off, when an interior space having elasticity of volume forms at the outer wall of the piston, inside their roll-off zone. The pneumatic spring system also consists of at least one control valve configured in particular as a magnet valve; a compressor having integrated residual pressure maintaining function; and a pilot controlled check valve connected to the pneumatic spring, which is preferably situated in the pneumatic spring cap or piston, and as such is accommodated in a housing, although different mounting variations exist. The invention also relates to a particularly advantageous design for the pilot controlled check valve, using a flexible tube of resistant plastic lodged in a valve boring, and an elastomeric valve plate. The valve plate is pushed aside by the tube, thus unblocking the valve boring (operating state).

12 Claims, 6 Drawing Sheets

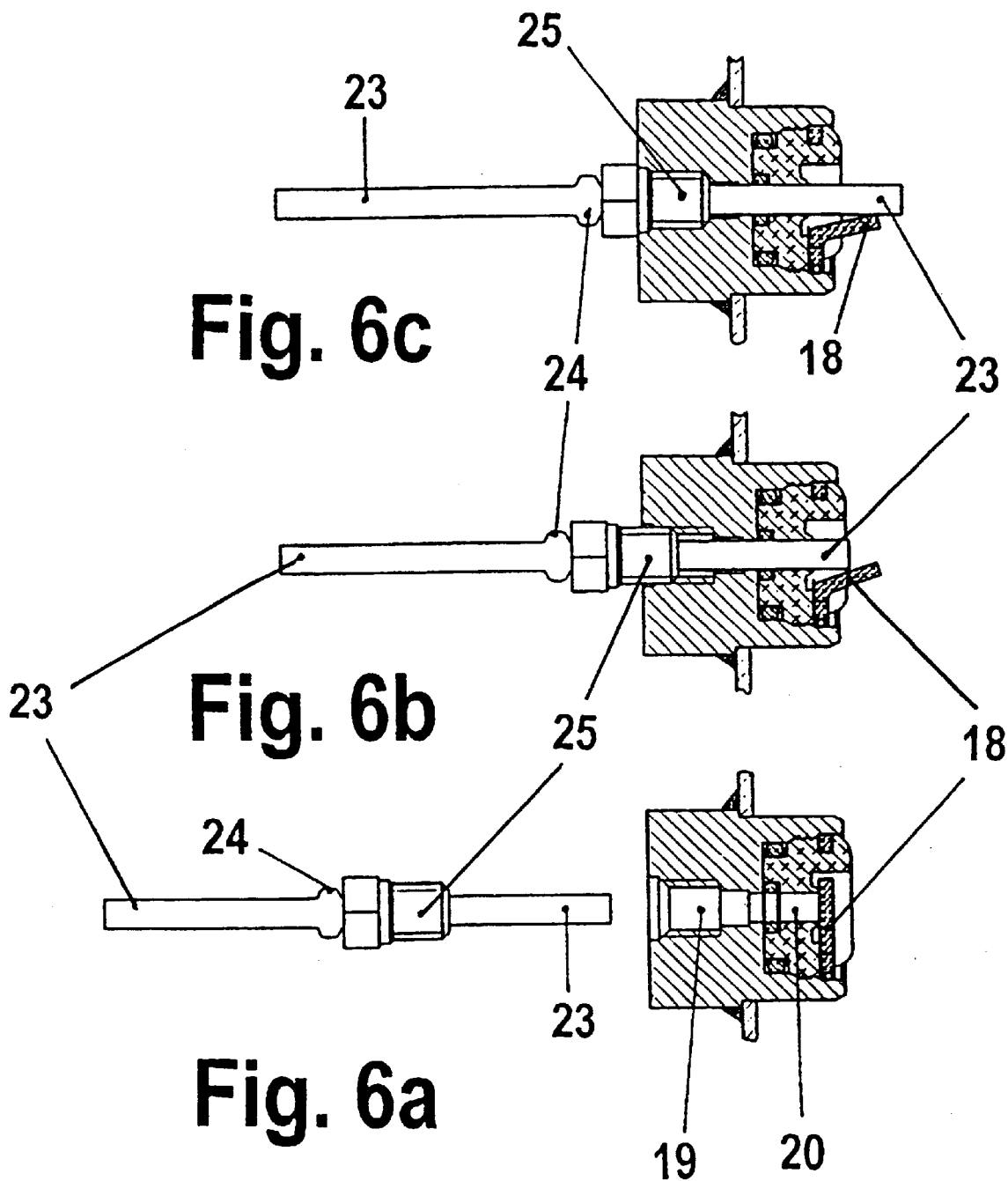

PNEUMATIC SPRING SYSTEM

The invention relates to a pneumatic spring system comprising at least one pneumatic spring at least consisting of a pneumatic spring cap as an upper component; a pneumatic spring bellows made of elastomeric material, said bellows connecting the two opposite elements with the help of fastening elements, whereby the bellows can roll off within its roll-off zone on the outer wall of the piston, forming an interior space having elasticity of volume; at least one control valve, in particular in the form of a solenoid valve; as well as a compressor with integrated residual pressure-maintaining function.

So as to allow superior installation in the vehicle or for protecting the pneumatic spring system against operating without pressure, pneumatic valves are employed especially in passenger motor vehicles. Such valves have the function of closing when the pressure of the pneumatic spring falls short of a defined value (residual pressure-maintaining function). With such a type of valve it is possible to cover the cases mentioned above.

U.S. Pat. No. 4,671,323 describes a pneumatic spring system provided with a releasable check valve, reference being made especially to FIGS. 2 to 6 regarding the constructional details and functional principle of the valve.

However, compressors are employed in pneumatic spring systems for passenger motor vehicles as well, such compressors having a residual pressure-maintaining function on their part.

Now, by combining the releasable check valve as defined by the invention in the characteristic part of patent claim 1, with the residual pressure-maintaining valve installed in the compressor it is possible to cover the above-mentioned cases as well. Prefilling of the pneumatic spring (for example for installation purposes) is achieved through the nonreturn function.

The advantages offered by the check valve as defined by the invention over a residual pressure valve include the simpler and more favorable structure in terms of cost, the improved tightness, as well as the extensive independence of the function of temperature, age etc.

Useful configurations of the check valve as defined by the invention are specified in claims 2, 3, 5–7, and 10–15.

Now, the invention is explained in greater detail in the following with the help of exemplified embodiments and by reference to schematic drawings, in which:

FIG. 6a shows a releasable check valve according to FIG. 5 in the condition in which it is stored.

FIG. 6b shows a releasable check valve according to FIG.5 in the condition in which it is installed or moved; and FIG.6c shows a releasable check valve according to FIG. 5 in the operating condition.

Figure 1:
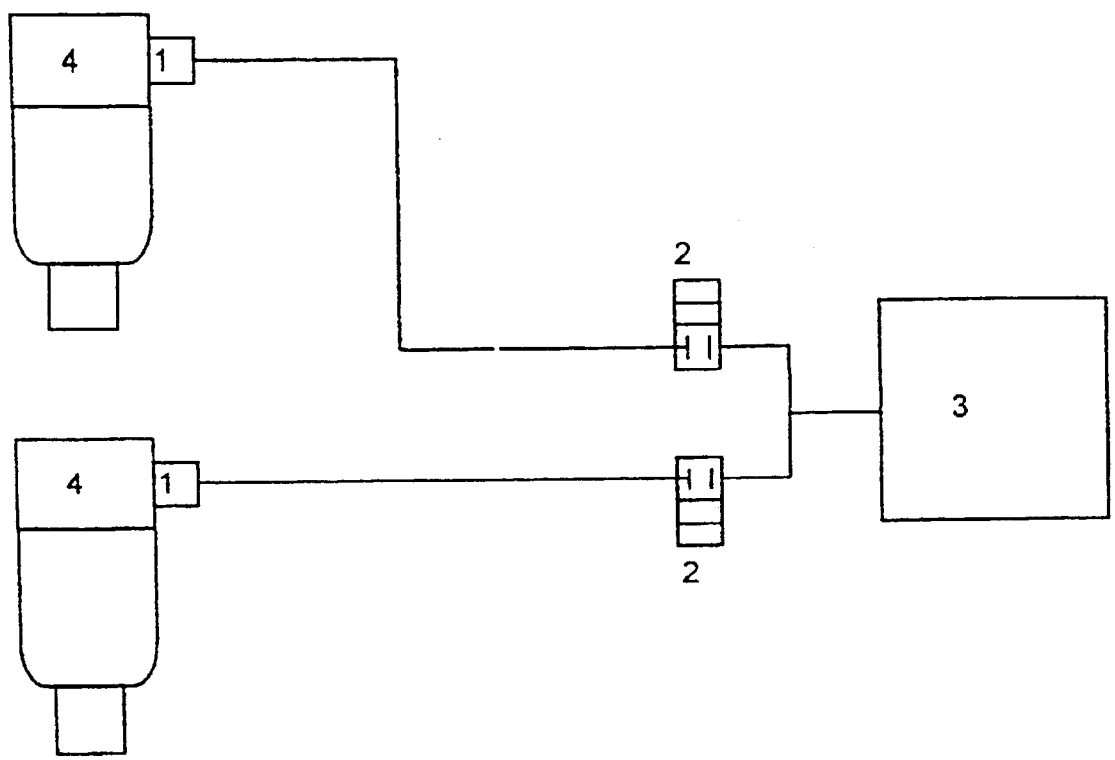
FIG. 1 is a circuit diagram of a pneumatic spring system.

The following list of reference numerals and symbols is applicable in association with the above figures.

1 Releasable check valve
1' Releasable check valve
1" Releasable check valve
1'" Releasable check valve
1"" Releasable check valve
2 Control valve (solenoid valve)
3 Compressor with integrated residual pressure-maintaining function
4 Pneumatic spring
4' Pneumatic spring
4" Pneumatic spring
4'" Pneumatic spring
5 Pneumatic spring cap
5' Side region of pneumatic spring cap
6 Valve housing
7 Pneumatic spring bellows
8 Pneumatic spring piston
9 Roll-off zone of pneumatic spring piston
10 Fastening element
10' Fastening element
11 Welding site
12 Pneumatic spring cap
13 Pneumatic spring piston
13' Roll-off zone of pneumatic spring piston
13" Lower side region of pneumatic spring piston
14 Pneumatic spring piston
14' Roll-off zone of pneumatic spring piston
14" Lower side region of pneumatic spring piston
15 Valve housing
16 Valve housing
17 Connecting plate
18 Valve plate made of elastomeric material
19 Valve bore for receiving a hose connection fitting
20 Valve bore for receiving a hose
21 Valve seat
22 Sealing ring made of elastomeric material
22' Sealing ring made of elastomeric material
23 Hose made of plastic
24 Bead-like stop means
25 Hose connection fitting.

According to the circuit diagram shown in FIG. 1, compressor (3) with integrated residual pressure-maintaining function is connected with two pneumatic springs (4), in each with the use of an interconnected solenoid valve (2). Now, within the zone of the pneumatic spring cap, each pneumatic spring (4) is equipped with a releasable check valve (5).

Figure 2:
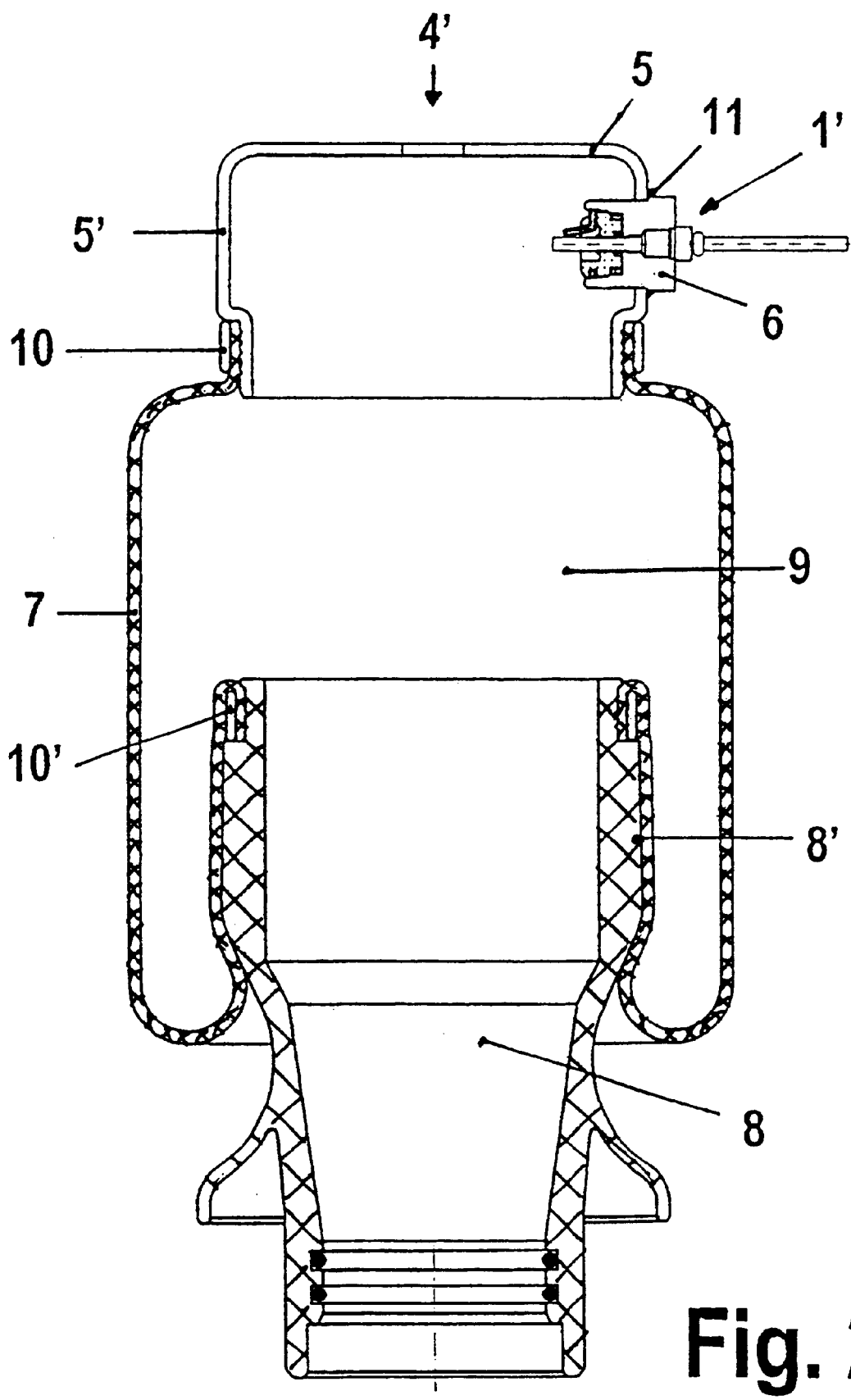
FIG. 2 shows a releasable check valve, the housing of which is welded into the pneumatic spring cap.

According to FIG. 2, the pneumatic spring (4') consists of a pneumatic spring cap (1) as the upper component, a pneumatic spring piston (8) as the lower component, as well as of a pneumatic spring bellows (7) made of elastomeric material, said pneumatic spring bellows connecting the two opposite components with each other by means of fastening elements (10, 10') in the form of clamping rings, whereby the bellows (7) is capable of rolling off within its roll-off zone (8') on the outer wall of the piston (8), forming an interior pneumatic spring space (9) having a flexible volume.

The releasable check valve (1') is accommodated in a valve housing (6). In this connection, the pneumatic spring cap (5) has an enlarged side area (5'), which is provided with an aperture in which the valve housing (6) is seated, whereby the housing is welded to the pneumatic spring cap (5) (welding site 11).

Figure 3:
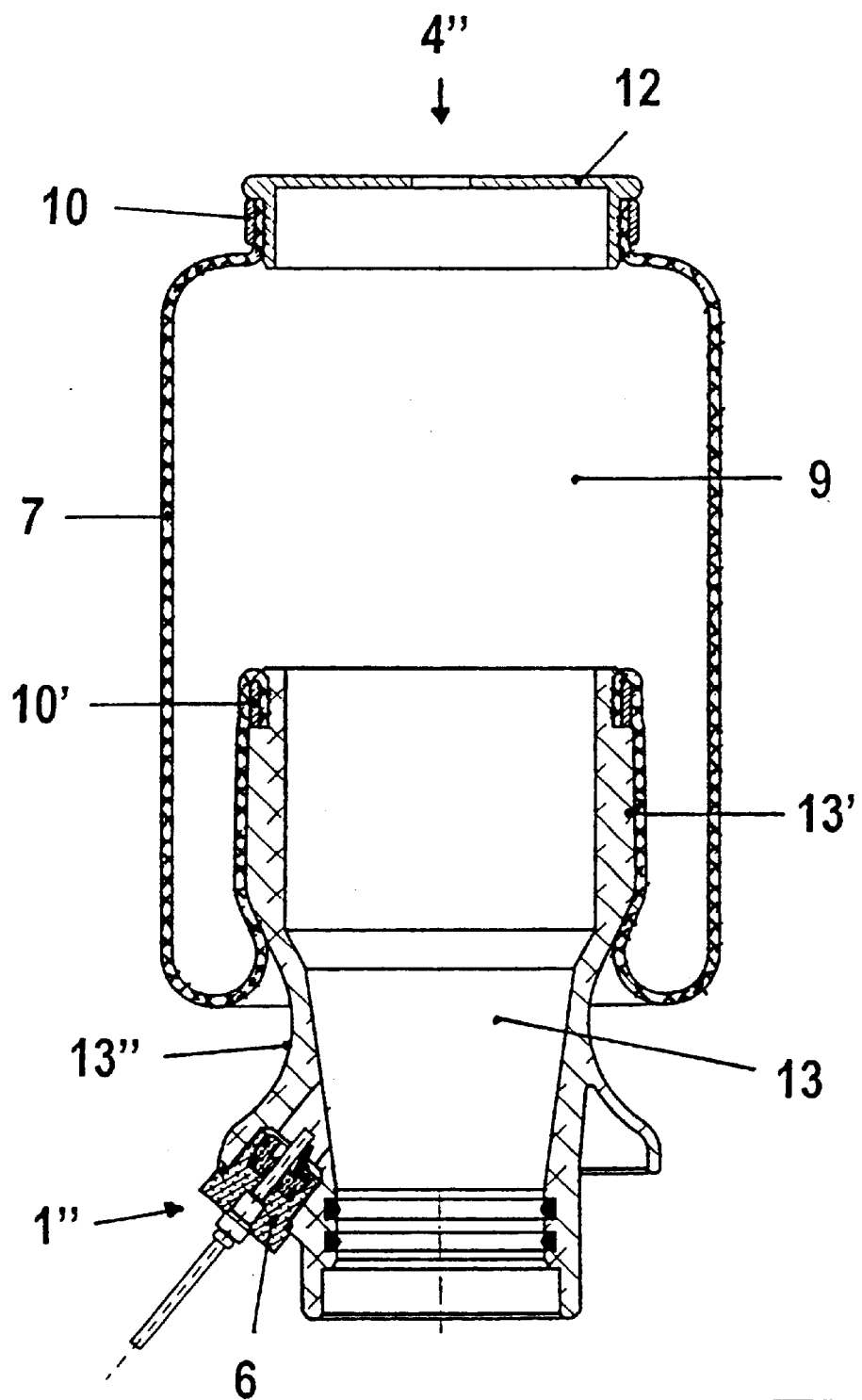
FIG. 3 shows a releasable check valve, the housing of which is screwed into an opening of the pneumatic spring piston.

FIG. 3 shows a pneumatic spring (4") equipped with a simple design of a pneumatic spring cap (12). In the present embodiment, only the pneumatic spring bellows (7) is anchored by means of the fastening element (10). The other end of the bellows (7) is connected with the pneumatic spring piston (13) by means of the fastening element (10'), whereby the bellows (7) is capable of rolling off within the roll-off zone (13') of the piston (13).

In the present embodiment, too, the releasable check valve (1") is accommodated in a housing (6). However, in the present case, the pneumatic spring piston (13) is provided with an opening within its lower side region (13'), with the valve housing (6) now seated in said opening. The housing (6) is screwed into said opening.

Figure 4:
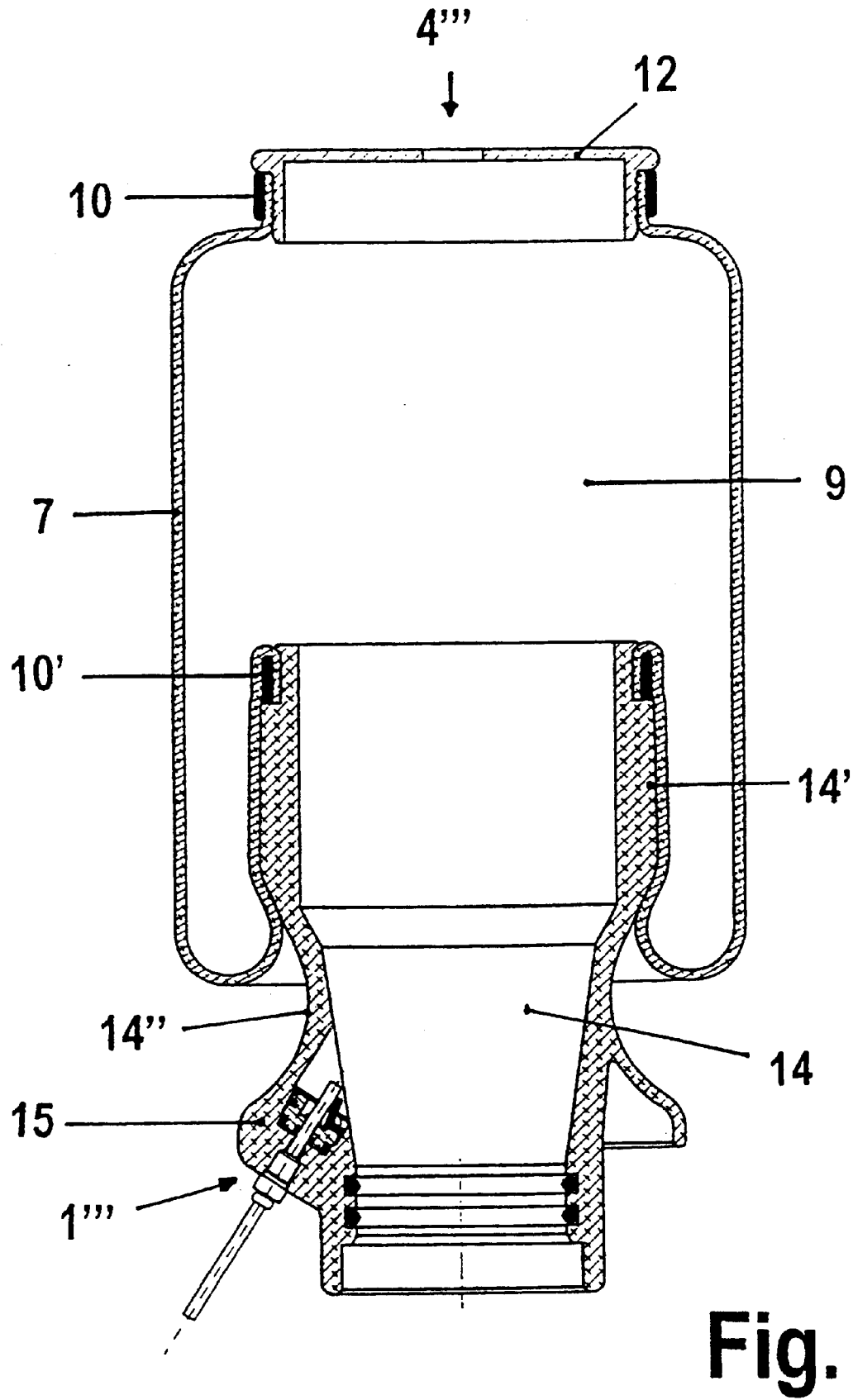
FIG. 4 shows a releasable check valve, the housing of which forms a one-piece composite with the pneumatic spring piston.

According to FIG. 4, the valve housing (15) of the releasable check valve (1''') is forming a one-piece composite with the pneumatic spring piston (14) within the lower side region (14") of the piston. In all other respects, the pneumatic spring (4''') has the same construction as the pneumatic spring (4") according to FIG. 3.

Figure 5:
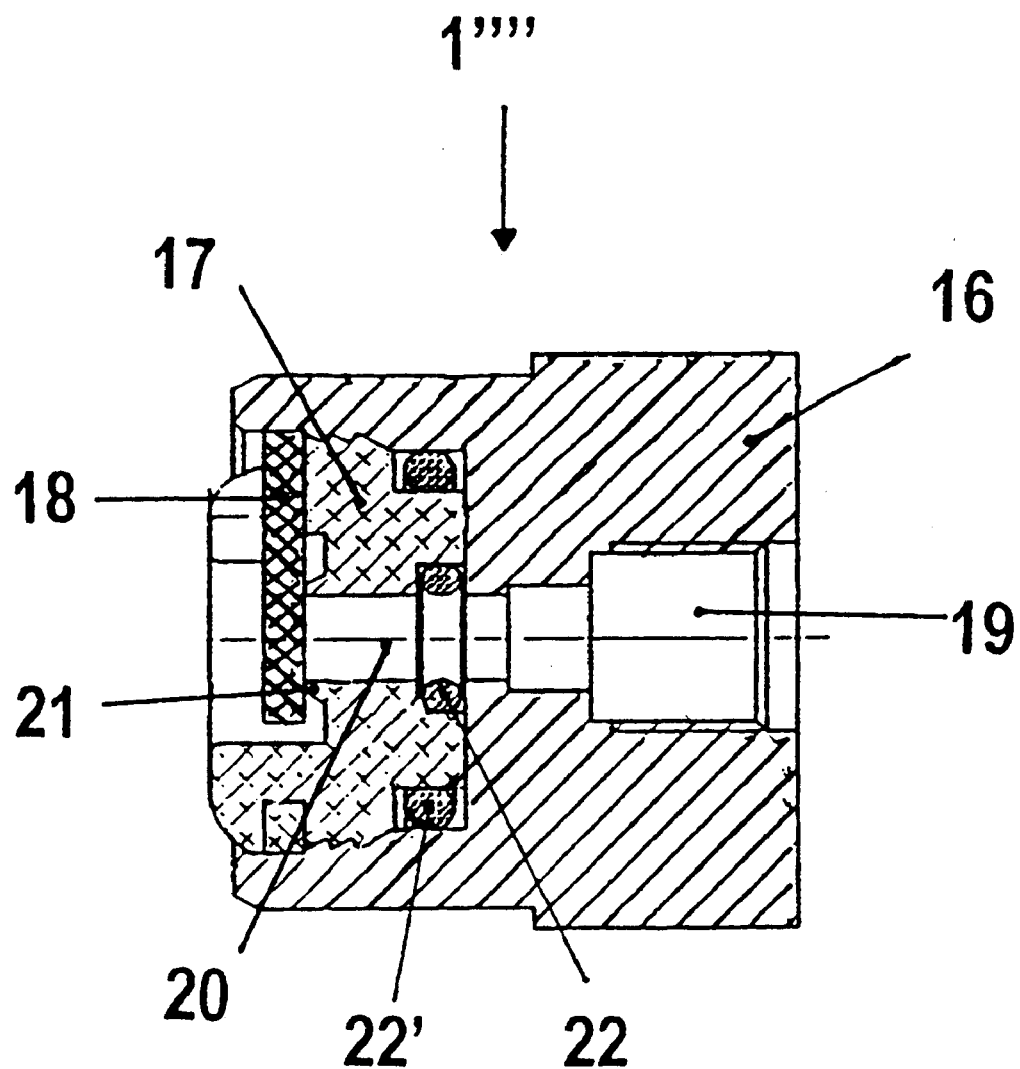
FIG. 5 shows a preferred embodiment of a releasable check valve.

Now, FIG. 5 shows constructional details of a releasable check valve (1''''). According to said FIG. 5, the valve housing (16), which preferably consists of metal, is provided with a valve bore (19) for receiving a hose (23) with a hose connection fitting (25) (FIGS. 6a, 6b, 6c). Furthermore, a connecting plate (17) is present within a bore of the housing, said connecting plate also being provided with a valve bore (20) for receiving the hose (23). The connecting plate (17) is preferably made of plastic material. In the present embodiment, the two valve bores (19, 20) change into each other, forming a through-extending borehole. Furthermore, the connecting plate (17) is equipped with a valve seat (21) for the valve plate (18) made of elastomeric material. Two sealing rings (22, 22'), which are made of elastomeric material as well, and which are located between the connecting plate (17) and the valve housing (16), on the one hand, and between the connecting plate (17) and the hose (23), on the other, seal the check valve (1'''') against the outside, or against the hose (23).

FIG. 6a shows a hose (23) made of resistant plastic material, in particular polyamide. Said hose is provided with a bead-like stop means (24) forming a one-piece composite with the hose. The hose (23), furthermore, is equipped with a hose connection fitting (25) resting against the stop means (24). In this storage condition, the valve plate (18) seals the valve bores (19, 20) against the interior of the pneumatic spring.

Now, when the hose (23) is installed according to FIG. 6b, it penetrates with the hose connection fitting (25) the valve bores (19, 20; FIG. 6a), whereby the valve plate (18) is pushed sideways by the hose (23) made of resistant plastic, with the result that the valve bores are now released. Sealing is assured in this connection by the sealing ring (22).

In the operating condition according to FIG. 6c, now, the valve plate (18) is completely pushed to the side by the hose (23), with the result that the valve bores (19, 20; FIG. 6a) are released. The stop means (24) ensures that the path of the hose (23) is limited, which prevents the hose from penetrating too far in the direction of the interior space of the pneumatic spring (9; FIGS. 2, 3, 4).

When the system is dismantled according to FIG. 6b, this construction principle, furthermore, ensure that the pneumatic spring is not completely vented, because when the hose (23) is removed, the valve bores (19, 20; FIG. 6a) are sealed by the valve plate (18).

What is claimed is:

1. A pneumatic spring system comprising at least one pneumatic spring (4, 4', 4", 4''') at least consisting of
    a pneumatic spring cap (5, 12) as an upper component;
    a pneumatic spring piston (8, 13, 14) as a lower component, as well as
    a pneumatic spring bellows (7) made of elastomeric material, said bellows connecting the two oppositely disposed components with each other, using fastening elements (10, 10'), whereby the bellows (7) is capable of rolling off within its roll-off zone (8', 13', 14') on the outer wall of the piston (8, 13, 14), forming an interior space (9) of the pneumatic spring with a flexible volume;
    at least one control valve (2) configured in particular as a solenoid valve; as well as
    a compressor (3) with integrated residual pressure-maintaining function; characterized in that
    the pneumatic spring (4, 4', 4", 4''') is provided with a releasable check valve (1, 1', 1", 1''', 1''''), whereby the check valve comprises the following components:
        a valve housing (6, 15, 16) made of metal or plastic, said housing being provided with a valve bore (19) for receiving a hose (23) with a hose connection fitting (25);
        a connecting plate (17) seated in a bore of the housing and provided with a valve bore (20) for receiving a hose (23), as well as with a valve seat (21) for a valve plate (18) made of elastomeric material and arranged toward the interior of the pneumatic spring, whereby the valve plate is pushed to the side by the hose (23) and thereby releases the two valve bores (19, 20), said bores changing into each other, forming a through-extending bore; as well as
        two sealing rings (22, 22') located between the connecting plate (17) and the valve housing (6, 15, 16), on the one side, and between the connecting plate (17) and the house (23) on the other.

2. The pneumatic spring system according to claim 1, characterized in that the check valve (1, 1', 1'''') is located in the cap (5) of the pneumatic spring.

3. The pneumatic spring system according to claim 1, characterized in that the check valve (1", 1''', 1'''') is located in the piston (13, 14) of the pneumatic spring.

4. The pneumatic spring system according to claims 2, characterized in that the pneumatic spring cap (5) has an enlarged side region (5') provided with an opening in which the valve housing (6, 16) is seated, whereby the housing is preferably welded to the pneumatic spring cap (welding site 11).

5. The pneumatic spring system according to claims 3, characterized in that the pneumatic spring piston (13) is provided within its lower side region (13") with an opening in which the valve housing (6, 16) is seated preferably screwed into said opening.

6. The pneumatic spring system according to claims 3, characterized in that the valve housing (15) forms a one-piece composite with the pneumatic spring piston (14) specifically within the lower side region (14") of the piston.

7. The pneumatic spring system according to claim 1, characterized in that the valve housing (6, 15, 16) consists of metal, and the connecting plate (17) of plastic.

8. The pneumatic spring system according to claim 1, characterized in that the hose (23) consists of resistant plastic, preferably polyamide.

9. The pneumatic spring system according to claim 1, characterized in that the hose (23) is provided with a stop means (24) for limiting the path.

10. The pneumatic spring system according to claim 9, characterized in that the stop means (24) forms a one-piece composite with the hose.

11. The pneumatic spring system according to claim 9, characterized in that the stop means (24) is shaped in the form of a bead.

12. The pneumatic spring system according to claim 1, characterized in that the hose connection fitting (25) rests against the stop means (24).

* * * * *